Aug. 17, 1948.  A. J. MOSLEY  2,447,357
EMERGENCY TIRE SHOE
Filed Feb. 24, 1947
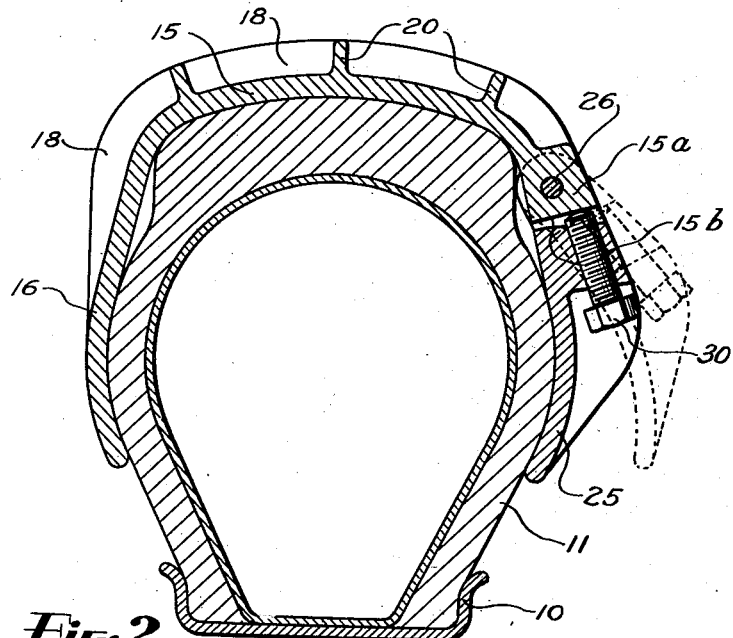
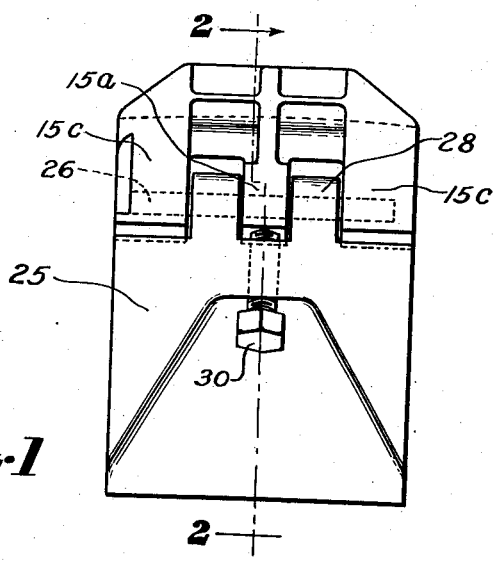
INVENTOR
ALFRED J. MOSLEY
BY *Fay, Golrick & Fay*
ATTORNEYS Patented Aug. 17, 1948

2,447,357

UNITED STATES PATENT OFFICE 2,447,357

EMERGENCY TIRE SHOE

Alfred J. Mosley, Euclid, Ohio, assignor to The National Bronze and Aluminum Foundry Company, Cleveland, Ohio, a corporation of Ohio Application February 24, 1947, Serial No. 730,292

2 Claims. (Cl. 152—228)

This invention is concerned with emergency devices for application to tires of the driving wheels of an automotive vehicle when the vehicle is stalled in snow drifts, mud ruts, etc.

The general object of the invention is the provision of a rugged structure for an emergency tire shoe which may be applied directly and expeditiously to the tire per se and while so positioned to serve as an emergency traction means to prevent the driving wheels from spinning.

A more specific object of the present device is the provision of an emergency tire shoe so arranged and constructed that it may be firmly attached to the tire walls and tread portion in a firm manner without endangering the carcass structure of the tire.

Other objects and advantages of the invention may be apparent from the following detailed description of the preferred form of embodiment of the invention, reference being made to the accompanying drawings, wherein:

Fig. 1 is an outer side view of the emergency tire shoe structure incorporating the feature of my invention; and Fig. 2 is a cross-section of a tire and rim and of the device when applied to the tire.

Apart from the general use of skid chains as applied to the wheels and tires of trucks and automobiles, the art has been developed along the line of providing some form of an emergency means which can be applied to the tires of the traction wheels of the truck or passenger car for maneuvering the vehicle out of a stalled condition incident to ice, snow, ruts, mud, etc. Some of these devices have involved the necessity of the use of various fastening means attachable to the rim or felloe, or some part of the wheel rim. Others have been devised for attachment directly to the tire, but in such fashion as to endanger the side wall structure of the tire when the wheels are exerting an extreme torque load.

I have devised my present emergency shoe structure in such a way that the device can be quickly applied directly to the tire in such a way as to engage a substantial circumferential section of the tire and thus distribute the unusual load thus concentrated due to the emergency purpose of the device. Furthermore, my structure is such that the shoe is generally U-shaped, thereby permitting convenient and simple application to the tire, and I effect a locking of the device to the tire in a very simple manner.

In the drawings I show an inflated tire and rim assembly in cross-section comprising rim 10 and tire 11. It will be noted that the general structure and arrangement is in the form of a U. The body of the shoe comprises a cast metal member 15, conforming to the general shape of the tread formation of an automobile tire, along the top thereof. I provide an integral downwardly extending side portion 16 which serves the purpose of a tire clamping portion integrally cast with the tread engaging portion 15. This cast member is of a substantial width, say, from four to five inches, and the part 15 thereof is provided with reinforcing transversely extending ribs 18 thereacross and extending downwardly to terminate in the side structure 16. Longitudinal ribs 20 extend between the transverse ribs 18 and this general rib structure is in such form as to comprise a metallic tread for gripping into mud, snow or ice.

The side opposite the integral clamping portion 16 of the device comprises a similarly formed tire wall clamping means in the form of a wide arm 25 hingedly attached to the main casting 15 by a pin 26.

As shown in Fig. 1, the shape of the member 25, in addition to being formed to properly grip the side wall of the tire, is also shaped to provide spaced double hinge lugs 28, forming a bifurcation for a central hinged portion 15a, formed on the member 15. The member 15 also has two outside hinge portions 15c. The pin 26 extends through all of these hinge portions.

A locking screw 30 is in alignment with the portion 15a to engage a flat face 15b thereof. The hinged member 25 is so shaped that the clamping bolt or screw 30 can be disposed in offset relation to the axis of the pin 26, whereby the bolt 30 can serve as a wedge to cause the member 25 to be clampingly swung toward the portion 16, thus effecting a gripping of the side walls of the tire by the portion 16 and arm 25.

The shape of the swingable member 25 is also such as to be of considerable strength and yet provide clearance for the head of the bolt 30 whereby the socket wrench used for demounting the wheel and tire assembly can also be used for clamping my device to the tire and for removing the same.

I prefer to have the members 15, 16 and 25 formed of a cast non-corroding metal such as an aluminum alloy and the bolt may be plated to prevent rust formation. It will be found that the design of the parts as shown in the drawings will have sufficient strength for the intended purpose when aluminum castings are used.

I claim:

1. A detachable emergency traction device for automobiles consisting of a cast anti-skid shoe formed to conform generally to the tread portion of a pneumatic tire and having integrally formed of side walls, one of the side walls conforming to the side wall shape of the tire to extend toward the tire rim more than half of the radial dimension of the tire, the other side wall of the device being formed to terminate adjacent the tread formation of the tire and terminating in a hinge formation, a second cast member having a hinge formation complementary to the hinge formation of the first cast member conforming in general shape to the side wall of the tire and to extend toward the tire rim more than half of the radial dimension of the tire, a hinge pin connecting the two hinge formations and a bolt in threaded engagement with the second cast member adjacent its hinge formations and adapted to react against the hinge formation of the first cast member and thereby cause the device to be clamped to the side walls of a tire.

2. A device of the character described comprising two hingedly connected cast members, one of the members forming an anti-skid tread and tire side wall clamp arm and the other member forming an opposite side wall clamp arm, a hinge pin connecting the two members and a locking bolt in treaded engagement with one of the cast members and abutting the other cast member and disposed in offset relation to the axis of the hinge pin thereby to obtain a mechanical advantage and whereby advancing the bolt will cause the device to be clamped to the side walls of a tire.

ALFRED J. MOSLEY.

REFERENCES CITED

The following references are of record in the file of this patent:

UNITED STATES PATENTS

| Number | Name | Date |
| --- | --- | --- |
| 1,941,935 | Erickson | Jan. 2, 1934 |
| 2,119,447 | Stahl | May 31, 1938 |
| 2,154,047 | Krider | Apr. 11, 1939 |